(12) United States Patent
Hsu et al.

(10) Patent No.: US 7,386,082 B2
(45) Date of Patent: Jun. 10, 2008

(54) METHOD AND RELATED APPARATUS FOR SEARCHING THE SYNCWORD OF A NEXT FRAME IN AN ENCODED DIGITAL SIGNAL

(75) Inventors: Chien-Hua Hsu, Hsin-Chu (TW); Tzueng-Yau Lin, Tai-Chung Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 772 days.

(21) Appl. No.: 10/710,872

(22) Filed: Aug. 10, 2004

(65) Prior Publication Data
US 2005/0100122 A1    May 12, 2005

(30) Foreign Application Priority Data
Nov. 7, 2003    (TW) .............................. 092131299 A

(51) Int. Cl.
*H04L 7/00* (2006.01)

(52) U.S. Cl. .................. 375/368; 375/362; 375/354; 375/365; 370/509; 370/512

(58) Field of Classification Search ................ 375/354, 375/362, 365, 368; 370/509, 512
See application file for complete search history.

(56) References Cited

U.S. PATENT DOCUMENTS 5,777,992 A * 7/1998 Lokhoff ....................... 370/389
2002/0027845 A1* 3/2002 Sogabe et al. ........... 369/47.22

FOREIGN PATENT DOCUMENTS

WO    WO03036622 A2    5/2003

\* cited by examiner

*Primary Examiner*—Phuong Phu
(74) *Attorney, Agent, or Firm*—Winston Hsu

(57) ABSTRACT

A method and apparatus for searching the synchronization signal of a next frame in encoded digital signal without the need of referring to a frame length indication signal. The encoded digital signal contains a plurality of frames, wherein each frame may have varying length and contain a synchronization signal. The method includes determining a search region, and locating the synchronization signal in the search region.

28 Claims, 5 Drawing Sheets

MPEG audio layer-1 frame format

| (Header) | (Alloc) | (Scalefactors) | (Samples) | (ANC) |

MPEG audio layer-2 frame format

| (Header) | (Alloc) | (SCFSI) | (Scalefactors) | (Samples) | (ANC) |

MPEG audio layer-3 frame format

| (Header) | (Sideinfo) | (Scalefac,Samples) | (ANC) | (Succeeding frame's data) |

Fig. 1 Related Art

MPEG Header

| Column | Syncword | ID | layer | Protection bit | bit-rate index | Sampling-rate index | Padding bit |
|---|---|---|---|---|---|---|---|
| Bit number | 12 | 1 | 2 | 1 | 4 | 2 | 1 |
| Column | Private_bit | Mode | Mode extension | Copyright | Original | Emphasis | |
| Bit number | 1 | 2 | 2 | 1 | 1 | 2 | |

Fig. 2 Related Art

| Bit-rate index | Sampling-rate index | | |
| --- | --- | --- | --- |
| | 0(44.1 kHz) | 1(48 kHz) | 2(32 kHz) |
| 1 (32 kbps) | Starting position:106 Ending position:104 | Starting position:97 Ending position:96 | Starting position:145 Ending position:144 |
| 2 (40 kbps) | Starting position:132 Ending position:130 | Starting position:121 Ending position:120 | Starting position:181 Ending position:180 |
| 3 (48 kbps) | Starting position:158 Ending position:156 | Starting position:145 Ending position:144 | Starting position:217 Ending position:216 |
| 4 (56 kbps) | Starting position:184 Ending position:182 | Starting position:169 Ending position:168 | Starting position:253 Ending position:252 |
| 5 (64 kbps) | Starting position:210 Ending position:208 | Starting position:193 Ending position:192 | Starting position:289 Ending position:288 |
| 6 (80 kbps) | Starting position:263 Ending position:261 | Starting position:241 Ending position:240 | Starting position:361 Ending position:360 |
| 7 (96 kbps) | Starting position:315 Ending position:313 | Starting position:289 Ending position:288 | Starting position:433 Ending position:432 |
| 8 (112 kbps) | Starting position:367 Ending position:365 | Starting position:337 Ending position:336 | Starting position:505 Ending position:504 |
| 9 (128 kbps) | Starting position:419 Ending position:417 | Starting position:385 Ending position:384 | Starting position:577 Ending position:576 |
| 10 (160 kbps) | Starting position:524 Ending position:522 | Starting position:481 Ending position:480 | Starting position:721 Ending position:720 |
| 11 (192 kbps) | Starting position:628 Ending position:626 | Starting position:577 Ending position:576 | Starting position:865 Ending position:864 |
| 12 (224 kbps) | Starting position:733 Ending position:731 | Starting position:673 Ending position:672 | Starting position:1009 Ending position:1008 |
| 13 (256 kbps) | Starting position:837 Ending position:835 | Starting position:769 Ending position:768 | Starting position:1153 Ending position:1152 |
| 14 (320 kbps) | Starting position:1046 Ending position:1044 | Starting position:961 Ending position:960 | Starting position:1441 Ending position:1440 |

Fig. 4

METHOD AND RELATED APPARATUS FOR SEARCHING THE SYNCWORD OF A NEXT FRAME IN AN ENCODED DIGITAL SIGNAL

BACKGROUND OF INVENTION

The invention relates to a method and apparatus for searching the synchronization signal of a next frame and thus determining the frame length of the current frame in digital encoded signals. More particularly, the invention relates to a method and apparatus for utilizing a lookup table to determine a search region and backward-searching the synchronization signal of the next frame in the search region.

Various digital video/audio processing standards are widely used in the industry to encode the video or audio data into digital encoded signals for further transmission or storing operations. For instance, MPEG audio standard (ISO/IEC 11172-3 and ISO/IEC13818-3) is for compressing and decompressing audio signals with different sampling rates and bit rates. MPEG audio standard defines three layers, which are Layer I, Layer II, and Layer III. The digital encoded signals conforming to MPEG audio standard includes a plurality of frames; each frame includes a plurality of fields. FIG. 1 illustrates the format of a frame specified in the three different layers of the MPEG audio standard. Take MPEG audio layer-1 for example, each frame includes header, alloc, scalefactors, samples, and ANC fields. Though MPEG audio layer I, II, and III have different formats of frames, they have the same header formats, as shown in FIG. 2.

PEG audio standard defines compressing and decompressing audio signals with different sampling rates and bit rates. For some specific sampling rate and bit rate, frames with varying lengths are used to achieve average bit rate. Since each frame may have different length, the actual length of each frame has to be obtained when the digital encoded signal is to be decoded. In U.S. Pat. No. 5,777,992, a method used to calculate the length of a current frame is disclosed, and the following formula is included:

$$P = \frac{Br}{N} \times \frac{n_S}{F_S},$$

where P represents the number of slots included in the current frame; Br is a bit rate of the digital encoded signal; N is the number of bits included in a slot; $n_S$ is the number of samples included in a frame; and $F_S$ is the sampling rate of the digital encoded signal.

When a decoder of the related art receives a current frame of the above-mentioned digital encoded signal, the decoder first utilizes the above-mentioned formula to calculate the length of the current frame and then perform the following decoding operations toward the current frame. When P calculated by utilizing the formula is an integer, the current frame includes P slot(s); when the calculated P is not an integer, the current frame possibly includes P'r P'+1 slot(s), wherein P' is the highest integer whose value is less than P. To correctly decode the digital encoded signals with varying frame lengths, the decoder needs an approach to determine the number of slots (equal to either P' or P'1) included in the current frame.

In MPEG audio standard, the header includes a padding bit signaling the length of the frame. If the calculated P by utilizing the above-mentioned formula is not an integer, the decoder of the related art checks the padding bit; if the padding bit is 0, the current frame includes P' slots; if the padding bit is 1, the current frame includes P'+1 slots. In other words, the decoder of the related art utilizes the above-mentioned formula to calculate P and then determine the length of the current frame by checking the padding bit.

In the header of each frame in the digital encoded signal, a synchronization signal is included. The synchronization signal generally owns specific data patterns for easy identification. For digital encoded signals conforming to the MPEG audio standard, the synchronization signal is called 'syncword' The data pattern of the syncword is fixed as '1111 1111 1111' in the binary system, which is '0xFFF' in the hexadecimal system. The system of the related art can forward-search the fixed data pattern ('0xFFF') from the current frame so as to determine the syncword in a next frame. Afterwards, by calculating the difference of the positions between the syncword of the current frame and the syncword of the next frame, the length of the current frame is obtained.

There have been many MPEG audio encoders accumulated in the market, and some does not encode audio signals in a way strictly conforming to MPEG audio standard. According to MPEG standard, the specific data pattern is exclusively reserved for the syncword and should not appear in any other positions in the frames. However, for some digital encoded signals not strictly conforming to MPEG audio standard, the specific data pattern may appear in other positions in the frames. For instance, in MPEG audio standard, '0' should be utilized as a stuffing bit, so the stuffing sequence is '0000 . . . ' However, some encoders utilize '1' as the stuffing bit, so the stuffing sequence is '1111 . . . ' and may be confused with the syncword ('1111 1111 1111'). Therefore, the above-mentioned forward-searching method does not work due to the possibility that other data (such as the inappropriate stuffing sequence '1111 . . . ' may be incorrectly interpreted as the syncword, and thus an incorrect frame length of the current frame is obtained.

SUMMARY OF INVENTION

It is therefore an objective of the invention to provide a method and apparatus for determining the synchronization signal of a next frame in encoded digital signals without referring to the padding bit.

It is also an objective of the invention to provide a method and apparatus for determining the position of the synchronization signal of a next frame in encoded digital signals without using the formula.

According to the embodiment, a method for searching a synchronization signal of a next frame in digital encoded signals is disclosed. The digital encoded signals include a plurality of frames, and each frame includes a synchronization signal. The method includes using a lookup table to determine a search region for searching the synchronization signal of the next frame, and determining the position of the synchronization signal of the next frame in the search region in the digital encoded signals.

According to the embodiment, an apparatus for searching a synchronization signal of a next frame in digital encoded signals is disclosed. The digital encoded signals have a plurality of frames, and each frame has a synchronization signal. The apparatus includes a buffer for receiving the digital encoded signals, and a searching module coupled to the buffer for determining a search region used to search the synchronization signal of the next frame according to a lookup table and for determining the position of the synchronization signal of the next frame in the search region in the digital encoded signals.

These and other objectives of the present invention will no doubt become obvious to those of ordinary skill in the art after reading the following detailed description of the preferred embodiment, which is illustrated in the various figures and drawings.

BRIEF DESCRIPTION OF DRAWINGS

FIG. 1 is a schematic diagram of the frame formats of three different layers conforming to the MPEG audio standard.

FIG. 2 is a schematic diagram of header format conforming to MPEG audio standard.

FIG. 4 is an illustrative lookup table based on experimental statistics conforming to the MPEG 1 audio layer III standard (MP3).

DETAILED DESCRIPTION

Figure 3:
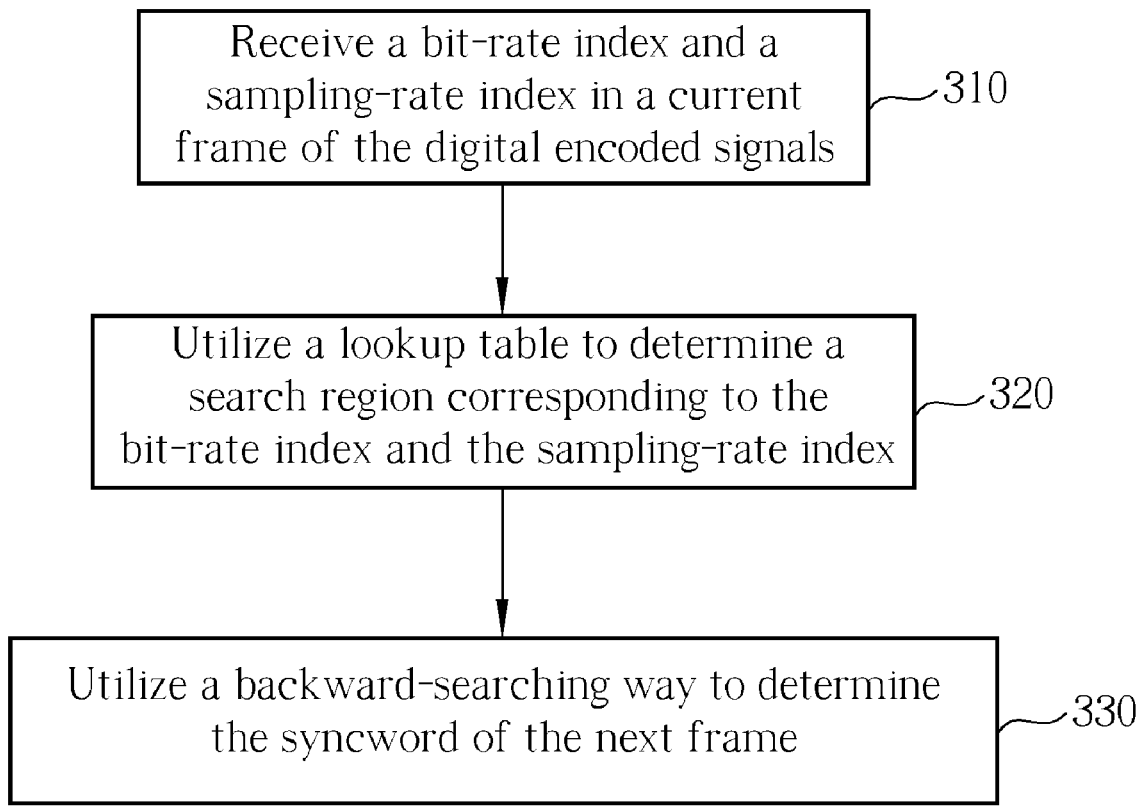
FIG. 3 is a flow chart of an embodiment of the method according to the present invention.

The method and related apparatus disclosed in the following embodiments conform to MPEG audio standard. FIG. 3 illustrates a flow chart of an embodiment of the method according to the present invention.

Step 310: Receive a bit-rate index (BRI) and a sampling-rate index (FSI) in a current frame of the digital encoded signals. In MPEG audio standard, the bit-rate index and the sampling-rate index are included in predetermined and fixed positions in the header of each frame.

Step 320: Utilize a lookup table to determine a search region corresponding to the bit-rate index and the sampling-rate index. FIG. 4 illustrates an example of a lookup table acquired by experimental statistics conforming to the MPEG 1 audio layer III standard (MP3). The search region of the lookup table is represented by the number of slots counted from the beginning of the current frame. For example, "Starting position: 106; Ending position: 104" indicates the search region starts from the $106^{th}$ slot counted from the beginning of the current frame, ends at the $104^{th}$ slot counted from the beginning of the current frame, and therefore includes the $106^{th}$ slot, the $105^{th}$ slot, and the $104^{th}$ slot. In this embodiment the lookup table is acquired by experimental statistics and is appropriate for MPEG 1 audio layer III (MP3). It is noted that in other embodiments the lookup table can be modified to be applied to different industrial standards. In addition, in this embodiment the lookup table is indexed by the bit-rate index and the sampling-rate index. It is also noted that the lookup table could be indexed by other information. For instance, in another industrial standard AAC (advanced audio coding, ISO/IEC 13818-7), the lookup table can be indexed by the frame length.

Step 330: In the search region of the digital encoded signals, utilize a backward-searching way to determine the syncword of the next frame. As mentioned above, some digital encoded signals may have '1' as the stuffing bit. Therefore in this embodiment the searching operation is performed in a backward-searching manner to avoid incorrectly identifying the stuffing sequence as the syncword. When performing the backward-searching operation in the search region, the first matched specific data pattern (for example, '1111 1111 1111' in this embodiment) is determined as the syncword. In the present embodiment, the backward searching can avoid the possibility of incorrectly identifying the stuffing sequence as the syncword. In other embodiments if the stuffing sequence will not be confused with the synchronization signal, it is feasible to search the syncword in the next frame of the search region by utilizing either the forward searching or the backward searching.

The lookup table shown in FIG. 4 is acquired based on the experimental statistics. As for each sampling-rate index and bit-rate index, the lookup table in FIG. 4 provides a search region represented by a starting position and an ending position. The lookup table may also indicate a search region represented by a starting position and the number of slots to be searched in a forward-searching or a backward searching manner. For example, the search region could be defined by 'starting position: 106, Number of slots: 3, Backward Searching' indicating a search range of three slots starting from the $106^{th}$ slot, which includes the $106^{th}$ slot, the $105^{th}$ slot, and the $104^{th}$ slot counted from the beginning of the current frame.

Figure 5:
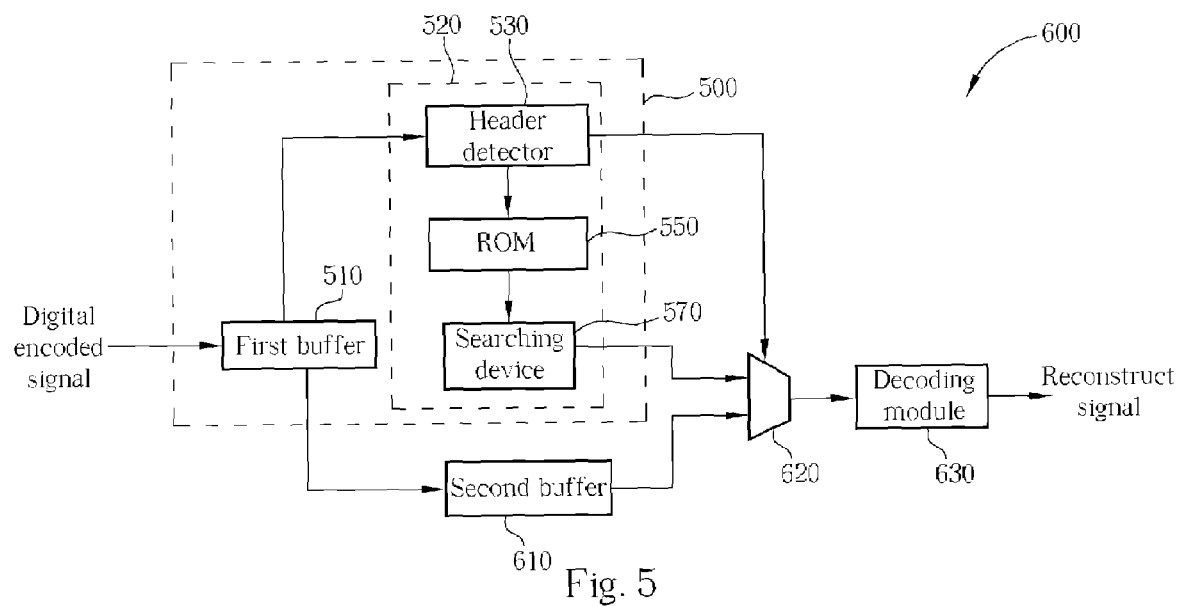
FIG. 5 is a schematic diagram of an embodiment of an apparatus according to the present invention.

FIG. 5 illustrates a schematic diagram of an embodiment of an apparatus according to the present invention. The apparatus 500 includes a first buffer 510 and a syncword-searching module 520. The syncword-searching module 520, which is coupled to the first buffer 510, includes a header detector 530 for receiving the bit-rate index and the sampling-rate index in a current frame of the digital encoded signal. A read-only memory 550 for storing a lookup table, and the syncword-searching module 520 can determine a search region corresponding to the bit-rate index and the sampling-rate index in the lookup table. A searching device 570 is used for backward-searching a specific data pattern to determine the syncword of a next frame in the search region of the digital encoded signal. In order to prevent the searching device 570 from incorrectly identifying the stuffing sequence as the syncword, the searching device 570 set the first-matched specific data pattern as the correct syncword during the backward-searching process. In other embodiments if the stuffing sequence will not be confused with the syncword, it is feasible to search the syncword in the next frame of the search region in either the forward searching or the backward searching manner.

In the present embodiment, the apparatus 500 is installed in a decoder 600, and the decoder 600 includes a second buffer 610, a multiplexer 620, and a decoding module 630 in addition to the apparatus 500. The second buffer 610 and the multiplexer 620 are mainly used to process encoded MPEG audio Layer III signals. The header detector 530 can control the multiplexer 620 according to the detected format of the digital encoded signal. For instance, when the header detector 530 detect that the digital encoded signal conforms to the MPEG 1 Audio Layer III standard, the digital encoded signal can be transmitted to the decoding module 630 via the first buffer 510, the second buffer 610, and the multiplexer 620. The decoding module 630 can be used to parse the signals, reconstruct, and inverse map related data. When the digital encoded signal is an audio signal, the outputted reconstruct signal can be a pulse-code-modulation (PCM) audio signal.

It is obvious that the method and apparatus of the present invention are not constrained to be applied only to the MPEG audio standard; the method and apparatus of the present invention can be applied to other digital encoded signals consisting of frames of varying lengths, wherein each frame includes the syncword of a specific data pattern.

In contrast to the related art, the method and apparatus according to the present invention looks up a table to determine the possible position of the synchronization signal of the next frame instead of utilizing a formula-related calculation and the padding bit, utilizes a backward-searching way to determine the synchronization signal of the next frame according to the predetermined data pattern of the synchronization signal, and then compares the spatial difference between the synchronization signal of the next frame and the synchronization signal of the current frame to obtain the length of the current frame for further decoding operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for locating a synchronization signal of a next frame in a digital encoded signal, the digital encoded signal comprising a plurality of frames, each frame comprising the synchronization signal, the method comprising:
   (a0) providing a lookup table defining a plurality of predetermined search regions;
   (a) determining a search region from the predetermined search regions of the lookup table according to the digital encoded signal; and
   (b) locating the synchronization signal of the next frame in the search region in the digital encoded signal.

2. The method of claim 1 wherein the step (a0) further comprises:
   (c) receiving a bit-rate signal and a sampling-rate signal in a current frame of the digital encoded signal;
   wherein in step (a), the lookup table is utilized to determine the search region according to the received bit-rate signal and the sampling-rate signal.

3. The method of claim 2 wherein the lookup table is stored with specific search regions, each of which corresponds to each set of the bit-rate signal and the sampling-rate signal.

4. The method of claim 2 wherein each search region stored in the lookup table comprises a starting position and an ending position.

5. The method of claim 1 wherein in step (b), locating the synchronization signal of the next frame comprises backward-searching a predetermined data pattern in the search region.

6. The method of claim 1 wherein in step (b), locating the synchronization signal of the next frame comprises forward-searching a predetermined data pattern in the search region.

7. The method of claim 1 wherein in step (b), locating the synchronization signal of the next frame comprises backward-searching the predetermined data pattern matched for a first time in the search region.

8. The method of claim 1 wherein the digital encoded signal is generated according to MPEG audio standard.

9. An apparatus for searching a synchronization signal of a next frame in a digital encoded signal, the digital encoded signal comprising a plurality of frames, each frame comprising the synchronization signal, the apparatus comprising:
   an input for receiving the digital encoded signal; and
   a searching module coupled to the input for determining a search region used to search the synchronization signal of the next frame according to the digital encoded signal and a lookup table having a plurality of predetermined search regions and for determining, in the search region, the position of the synchronization signal of the next frame.

10. The apparatus of claim 9 wherein the searching module is capable of receiving a bit-rate signal and a sampling-rate signal in a current frame of the digital encoded signal and utilizing the lookup table to determine the search region corresponding to the bit-rate signal and the sampling-rate signal.

11. The apparatus of claim 10 wherein the searching module comprises a memory unit for storing the lookup table.

12. The apparatus of claim 11 wherein the memory unit is a read-only memory.

13. The apparatus of claim 11 wherein the searching module further comprises:
   a header detector coupled to the input for receiving the bit-rate signal and the sampling-rate signal in the current frame; and
   a searching device coupled to the header detector and the memory unit for determining the position of the synchronization signal of the next frame in the search region in the digital encoded signal.

14. The apparatus of claim 9 wherein the searching module backward-searches a predetermined data pattern in the search region of the digital encoded signal to determine the position of the synchronization signal of the next frame.

15. The apparatus of claim 9 wherein the searching module forward-searches a predetermined data pattern in the search region of the digital encoded signal to determine the position of the synchronization signal of the next frame.

16. The apparatus of claim 9 wherein the searching module backward-searches the predetermined data pattern matched for a first time in the search region of the digital encoded signal to determine the position of the synchronization signal of the next frame.

17. The apparatus of claim 9 wherein the digital encoded signal is generated according to MPEG audio standard.

18. A method for decoding a digital encoded signal having frames each comprising a header, the header includes a synchronization signal, an index signal, and a frame-length indication signal, the frame-length indication signal indicates whether a current frame has a first length or a second length different from the first length, the method comprising the steps of:
   (a0) providing a lookup table defining a plurality of predetermined search regions;
   (a) receiving the bit-rate signal and the sampling-rate signal;
   (b) determining a search range from the predetermined search regions of the lookup table according to the bit-rate signal and the sampling-rate signal; and
   (c) locating the synchronization signal of a next frame by backward-searching a predetermined data pattern in the search region.

19. The method of claim 18, wherein the index signal includes a bit-rate signal and a sampling-rate signal.

20. The method of claim 18, wherein step (b) further comprises referring to the lookup table for determining the search range according to the index signal.

21. The method of claim 18, further comprising:
   (d) comparing a position of the synchronization signal of the next frame with a position of the synchronization signal of the current frame to determine whether the current frame has the first length or the second length without the need of referring to the frame-length indication signal.

22. The method of claim 18, wherein the frame-length indication signal includes a padding bit defined in MPEG audio standard.

23. A method for determining a frame length of a current frame in the process of decoding digital encoded signal, the digital encoded signal include frames each comprising a header, the header includes a synchronization signal, an index signal, and a frame-length indication signal, the frame-length indication signal indicates whether a current frame has a first length or a second length different from the first length, the method comprising:
- (a0) providing a lookup table defining a plurality of predetermined search regions;
- (a) receiving the index signal;
- (b) determining a search range from the predetermined search regions of the lookup table according to the index signal by referring to the lookup table;
- (c) locating the synchronization signal of a next frame by searching a predetermined data pattern in the search region; and
- (d) comparing a position of the synchronization signal of the next frame with a position of the synchronization signal of the current frame to determine whether the current frame has the first length or the second length without the need of referring to the frame-length indication signal.

24. The method of claim 23, wherein the step (c) further comprises locating the synchronization signal of a next frame by backward-searching the predetermined data pattern in the search region.

25. The method of claim 23, wherein the index signal comprises a bit-rate signal and a sampling-rate signal.

26. The method of claim 25, wherein the lookup table uses the bit-rate signal and the sampling-rate signal as indices for providing the search range.

27. The method of claim 1 wherein the search region having a plurality of slots and a length shorter than a frame length.

28. The method of claim 1 wherein the lookup table is not obtained from the digital encoded signal.

* * * * *